Dec. 30, 1952     A. W. JOHNSON     2,623,772
HAY TOOL
Filed Nov. 8, 1950
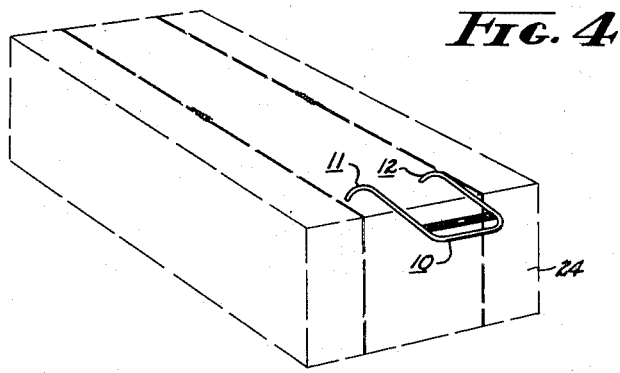
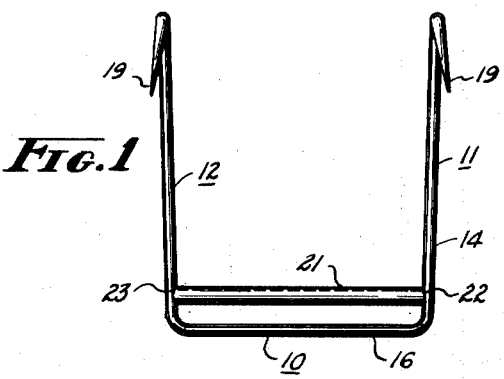
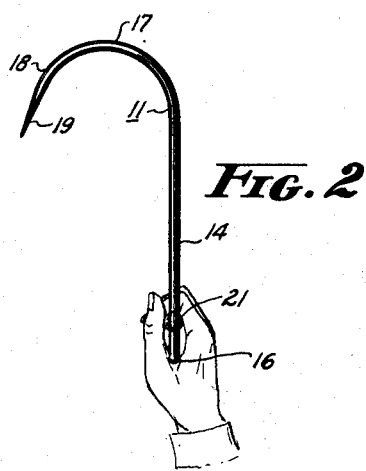
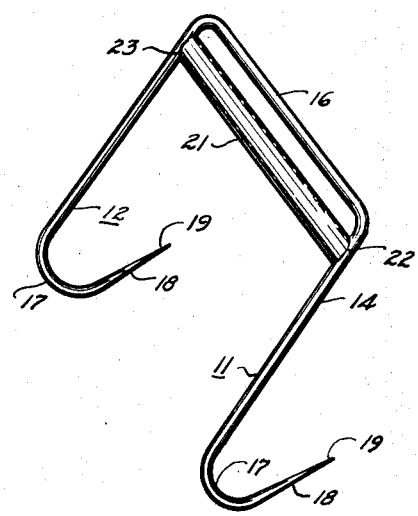
INVENTOR.
BY ARDELL W. JOHNSON
Flournoy Corey.
ATTORNEY.

Patented Dec. 30, 1952

2,623,772

UNITED STATES PATENT OFFICE 2,623,772

HAY TOOL

Ardell W. Johnson, Kalona, Iowa

Application November 8, 1950, Serial No. 194,679

2 Claims. (Cl. 294—26)

This invention relates to material handling tools and has particular relation to a device particularly suitable for handling baled hay.

Devices known to the art for the general purpose of handling hay are usually called bale hooks or bill hooks, and consist of a single tine or hook with a wooden handle bent at right angles to the plane of the tine and usually with the tine bent near the handle so that the tine is approximately at right angles to the center of the handle.

The devices of the prior art have several disadvantages, particularly when used with the more loosely packed hay as baled by present day machinery. They lack control—that is, it is difficult to control the position of a bale by means of the prior art hooks and, furthermore, the devices of the prior art had no means for controlling the hook itself so that frequently the hook would flop over in the hand and hit the back of the operator's hand.

It is one of the major objects of my invention, therefore, to provide a new and improved bale hook which will permit much better control of the baled hay by the bale engaging means, and another important object of my invention is to provide means for positive control of the position of the bale hook with reference to the operator's hand and arm so that he can move it at will without the necessity of the swinging motion necessary with the baling hooks of the prior art in order to engage them to a bale of hay.

Another object of my invention is to provide a bale hook which has improved engaging means and augmented engaging means to better engage the bale and prevent the hook from becoming dislodged from the bale or pulled out from the bale.

A still further object of the invention is to provide means for engaging a bale of hay or the like, which means permits rotating or tilting of the bale as desired.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a bottom view of a bale hook constructed according to a preferred embodiment of my invention.

Figure 2 is a view in side elevation of the bale hook shown in Figure 1.

Figure 3 is a view in perspective of the bale hook shown in Figures 1 and 2, and Figure 4 is a view in perspective of the bale hook as it appears engaging the bale of hay.

Referring now to the drawings:

A bale hook constructed according to a preferred embodiment of my invention may be comprised of at least two parts, one of the parts being the handle portion illustrated generally at 10, and the other consisting of the multiple hook portions 11 and 12.

The bale hook, in its preferred form, may be made of a single rod of iron or steel 14, sufficiently long to form both the tines as well as what may be termed the actuating or cross bar portion 16 of the handle 10. The tines 11 and 12 are bent in approximately a semi-circle, as best illustrated in Figure 2, at 17 with the outer end of the hook in substantially a straight line, as indicated at 18, and sharpened to a long point as indicated at 19.

The pointed ends of the tines may flare slightly outwardly, as indicated at Figure 1. However they may be located entirely within the planes of the tines.

The root ends of the tines are joined by a cross bar 21 which may be termed the pivot bar, and this bar may be of pipe or the like welded between the tines 11 and 12, preferably at a spaced distance from the cross bar portion 16 of the handle, as indicated at 22 and 23.

The pivot bar 21 and actuator bar 16 cooperate to furnish a turning leverage couple by which the position of the bale hooks may be readily controlled by the operator. The bale hook is ordinarily grasped by the operator with the pivot handle 21 lying within the curve of the four fingers, with the fingers wrapped about this pivot bar 21 in the same direction as the hooks of the bale hook. The thumb passes beneath the actuator bar 16 and pivot bar 21, as illustrated at Figure 2, with the actuator bar resting against the hollow of the hand and in the V of the thumb and palm of the hand.

In using the bale hook, the hook is generally rotated with the wrist as the pivot point and with further pivoting action occurring in the curve of the fingers about the pivot bar 21. The degree of rotation or pivoting of the bale hook is controlled by the control bar 16 since this bar projects against the palm of the hand into the V of the thumb and palm, and the position of this control bar 16, and thus of the tines of the bale hook, is readily controlled by the operator so that he can rotate it in his hand as he desires.

Engagement of the bale hook is usually accomplished by a sweeping, curving movement of the arm down onto the bale with the entire arm pivoting about the shoulder and with the hand pivoting about the wrist and with the bale hook in turn pivoting in the hand, so that in engaging the hook, the sweeping motion of the arm and the motion of the hand combine to provide an effective blow which will readily engage the pointed tines of the bale hook in the bale of hay. The position of the bale hook with reference to the hand is readily controlled by the lever arm couple afforded by the pivot arm 21 and control rod 16.

After the bale hook has been engaged to the bale of hay, it is apparent that since the tines of the bale hook engage the bale at two separated points, not only can the bale be rotated about the longitudinal axis of the bale hook, but also the bale may be tilted as desired by the operator by rotating the bale hook about its transverse axis. The double hooks afford two pressure points on the bale of hay and this is particularly effective in the most loosely packed bales of the present hay bales.

Although I have described a single embodiment of my invention, it is apparent that other modifications thereof may be made, for instance by making the pivot arm 21 and control bar 16 into a single flattened handle, or otherwise providing a control plane or control couple which is effective for the purpose of controlling the bale hook. These and other modifications may be made without departing from the spirit and scope of the invention as set forth in the appended claims.

I claim as my invention:

1. In a bale handling tool, a pair of spaced, curved tines having generally parallel shank portions, an integral cross-bar joining said shank portions together at the root ends thereof, and a second cross-bar affixed between the shank portions in spaced parallel relation to the integral cross-bar such that both of said cross-bars may be grasped simultaneously in the hand of a user with the second cross-bar lying within the curve of the user's fingers and with the integral cross-bar lying against the palm of the hand and in the V formed by the thumb and palm of the hand.

2. In a device of the class described, a pair of tines having curved pointed outer ends, the tines being joined at their roots by a cross bar, and a second cross bar connecting the roots of the tines, extending in parallel relation to the first cross bar, and spaced therefrom at a position such that said cross-bars may be simultaneously received in the palm of the user's hand, whereby a couple is provided for controlling the position of the bale hook in the operator's hand.

ARDELL W. JOHNSON.

REFERENCES CITED

The following references are of record in the file of this patent:

UNITED STATES PATENTS

| Number | Name | Date |
|--------|------|------|
| 456,559 | Francis | July 28, 1891 |
| 950,687 | Abernethy | Mar. 1, 1910 |
| 2,488,312 | Millican et al. | Nov. 15, 1949 |